Jan. 13, 1970   A. H. THOMPSON   3,489,002
VOLUME MEASURING METHOD AND APPARATUS
Filed Nov. 24, 1967
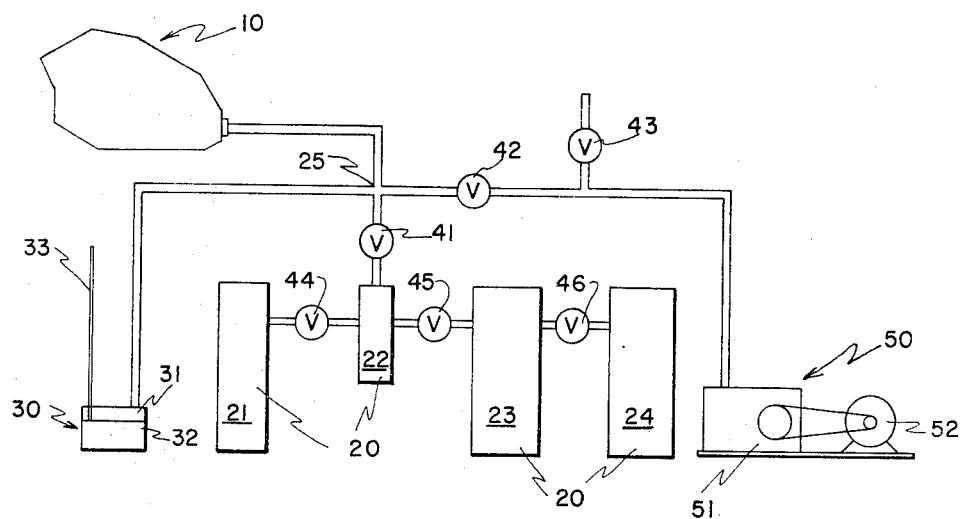
INVENTOR.
ARTHUR H. THOMPSON
BY
*N. Schmidt*
ATTORNEY

United States Patent Office 3,489,002
Patented Jan. 13, 1970

3,489,002
VOLUME MEASURING METHOD AND APPARATUS
Arthur H. Thompson, Grand Rapids, Mich., assignor to Lear Siegler, Inc.
Filed Nov. 24, 1967, Ser. No. 685,352
Int. Cl. G01f 17/00
U.S. Cl. 73—149                     2 Claims

ABSTRACT OF THE DISCLOSURE

The interior volume of a hollow article is measured by evacuating the gas from the interior of the article and then placing it in communicating relationship with respect to a container of known volume having a gas therein at a known pressure. The pressures in the container and hollow article are permitted to equalize and the equalized pressure thus obtained determined. Boyle's law is utilized to calculate the unknown volume of the hollow article.

BACKGROUND

This invention relates to methods and apparatus for making quantitative measurements of the properties of articles and, more particularly, to such a method and/or apparatus particularly adapted for determining the interior volume of a hollow article.

Often in the processes of manufacture and utilization of hollow articles, it is desirable and/or mandatory to obtain an accurate estimate of the interior volume of the article. A logical procedure for making such a determination is to fill the article with a liquid and measure the quantity required after its removal therefrom. Such a method is not always practical, however, since the introduction of liquid into many types of hollow articles will seriously hamper if not, indeed, completely destroy their utility. Additionally, problems are encountered where the access aperture into the interior of the article must, by design, be relatively small and, thus, wherein liquid may not be introduced into and removed from the article easily.

In recognition of this problem, a number of procedures have been evolved which depend basically upon the introduction of a gas into the article and the application of Boyle's Law to thereafter compute the unknown volume. One such device, for example, is illustrated in United States Patent No. 2,285,151. In the procedure contemplated by this particular patent, the unknown volume is positioned on the opposite side of a movable diaphragm from a container of known volume. The diaphragm is caused to oscillate, thereby creating pressure fluctuations within the unknown and known volumes. The rate of flow of the known masses of gas into the container and hollow article is sensed electronically and the volume of the article computed therefrom.

Devices such as the type shown in this patent are not only extremely expensive to procure and operate, but have the additional disadvantage of being quite sensitive to movement and other environmental changes. These drawbacks may be attributed, generally, to the necessity of providing a rather large number of complex components in order to execute the measuring process.

OBJECTS AND SPECIFICATION

It is an object of this invention, therefore, to provide a volume measuring apparatus and/or method which is not subject to the disadvantages outlined above.

More particularly, it is an object of this invention to provide a novel method and/or apparatus wherein the advantages of the "gas" volume measuring concept are retained without encountering the disadvantages which have been present in apparatus and/or methods available heretofore.

Thus, it is an object of this invention to provide a method and/or apparatus of the type described wherein the measurement of the interior volume of a hollow article may be accomplished with relative ease, by relatively unskilled persons, and utilizing equipment which is relatively inexpensive and not subject to environmental errors.

These as well as other objects of this invention will be readily understood with reference to the figure which is a schematic illustration of a suitable apparatus for the execution of this invention.

Briefly, this invention comprises the method of and/or apparatus for determining the interior volume of a hollow article comprising the collecting of a gas at a known pressure within a container having a known volume. The article whose volume is to be measured is evacuated or otherwise has its internal pressure changed with respect to the known pressure within the container. The container and article are then connected in communicating relationship with respect to one another to permit equalization of the pressures therein. The resultant equalized pressure is measured and utilized to compute the interior volume of the article from Boyle's Law.

Referring now to the figure, a preferred embodiment of this invention will be described in detail. An article 10 having an unknown volume which it is desired to measure, is connected by way of suitable tubing to one or a series of containers having known volumes indicated generally by the reference numeral 20. Preferably, a plurality of the containers of known volume are provided and at least some of the containers are of differing volumes. Thus, for example, container 21 might have a capacity of 400 cubic centimeters; container 22 a capacity of 100 cubic centimeters; and, containers 23 and 24 capacities of 1000 cubic centimeters. It is desirable to provide the known containers of varying sizes, as will become more apparent hereinafter, since best results are obtained when the known volume utilized in the particular tests approximates the unknown volume of the article 10.

Connected into the conduit between the article 10 and the containers of known volume 20 at junction 25 by way of another conduit is the manometer assembly 30. Manometer assembly 30 comprises a conventional hermetically isolated container 31 having mercury 32 or the like disposed therein and a calibrated column 33 extending upwardly therefrom.

A vacuum assembly, indicated generally by the reference numeral 50, and consisting of a pump 51 driven by a motor 52 is also connected to junction 25 by means of a suitable conduit. A series of valves, indicated by the reference numerals 41 through 46, are provided at the locations shown within the system. Thus, valve 41 is operative, when closed, to isolate the containers 20 of known volume from the remainder of the system; valve 42, when closed, isolates the vacuum assembly 50 from the remainder of the system; valve 43, when opened, permits air at atmospheric pressure to flow into the system; and, valves 44, 45 and 46 permit the operator to select a known volume 20 approximating that of the unknown article 10.

In order to ascertain the precise volume of the article 10, valves 44, 45 and 46 are either opened or closed in such a manner that the resultant capacity of the known-volume container assembly 20 approximates the volume of the hollow article 10. With valves 41, 42 and 43 open, and the pump not operating, the prevailing atmospheric pressure is noted on the manometer column 33 and recorded. Thereafter, valves 41 and 43 are closed and the vacuum pump 51 activated to evacuate the air from the interior of article 10. If necessary, during this process, a valve (not shown) in the conduit between junction 25 and the manometer assembly 30 may be closed to prevent any tendency for the manometer envelope 31 to collapse.

Once evacuation of the interior of the article 10 has been completed, valve 42 is closed which isolates the article 10, the known volume 20 and the manometer assembly 30 from the remainder of the system. Valve 41 is then opened and the pressure within the interior of article 10 and the known-volume containers 20 permitted to equalize. The new pressure level, indicated on the manometer, is then noted and recorded as was the original atmospheric level. The interior volume of the article 10 may then be calculated through the utilization of Boyle's Law as follows:

$$P_1:(V_1+V_2)=P_2:V_1$$

where $P_1$=Prevailent atmospheric pressure
$P_2$=Equalized pressure
$V_1$=Known volume
$V_2$=Unknown volume Thus, the unknown volume of the article 10 may be derived by utilization of the equation:

$$V_2=\frac{P_1V_1}{P_2}-V_1$$

The utilization of Boyle's Law necessitates the assumption, of course, that the temperature remains constant throughout the measuring and equalizing processes. Such is the case, in fact, where, as in the embodiments shown in the figure, the large surface area to volume ratio, which returns the air quickly to ambient temperature permits the neglect of any temperature change without appreciably effecting the accuracy of the measurement.

It should be noted, further, that the various manifolds or conduits utilized within the system to the left of valve 42 as shown in the figure (all except those connecting the vacuum assembly 50 and the bleed valve 43 into the system) as well as the manometer assembly 30 must be of small internal volume in order to make it possible to neglect their volumes during the calculations. Alternatively, of course, the volumes of these components might be accurately determined, the valving arrangement appropriately altered if necessary and appropriate additions and substractions made to the volumes of the known-volume containers 20 and/or the unknown-volume article 10.

While the preferred embodiment of this invention has been illustrated as including the step of or apparatus for evacuating the gas from the article 10, it will be readily appreciated by those skilled in the art that other procedures may be utilized without departing from the spirit and scope of this invention. For example, a known mass of gas might be introduced into the interior of the unknown-volume article 10 and the unknown volume could still be determined easily from calculations subsequent to measurement of the final equalization pressure. Thus, as used within this specification and the following claims, the term "pressure" depicts pressure which is either positive or negative with respect to atmospheric pressure, or, alternatively, positive or negative with respect to any other reference which might be utilized. Thus, while a preferred embodiment of this invention has been illustrated in detail, other embodiments, the concepts of which will be readily apparent to those skilled in the art from an examination of this specification and the attached drawing, are to be deemed as included within the scope of the invention.

What is claimed is:

1. Apparatus for determining the interior volume of a hollow article comprising:
   a container having a known volume;
   a manometer;
   a pressure pump;
   conduit means adapted to connect said container, manometer and pressure pump, said conduit means also including means for affixing said hollow article thereto such that its interior communicates thereinto;
   valve means for selectively isolating said container and said pump from the remainder of said apparatus;
   means associated with said conduit means for selectively opening it to the atmosphere; wherein said container of known volume comprises a plurality of separate receptacles each having a known volume including means for inserting or removing said plurality of receptacles individually into or out of communicating relationship with said conduit means whereby the volume of said container may be varied but remains known.

2. The apparatus as set forth in claim 1, including means for selectively opening each of said plurality of separate receptacles to the atmosphere whereby it will become filled with air at atmospheric pressure and wherein said pressure pump is connected to said conduit means to effect evacuation of said hollow article.

References Cited

UNITED STATES PATENTS

| 3,355,932 | 12/1967 | Mulligan | 73—149 |
| 1,076,664 | 10/1913 | Cloud | 73—149 |
| 2,113,686 | 4/1938 | Gift | 73—149 XR |
| 2,116,636 | 5/1938 | Neumann. | |
| 2,341,138 | 2/1944 | Davis | 73—149 |

FOREIGN PATENTS

| 19,588 | 8/1913 | Great Britain. |
| 152,078 | 1962 | Russia. |

S. CLEMENT SWISHER, Primary Examiner